July 30, 1929.  A. KLEINLERCHER  1,722,804
FITTING FOR COFFEE URNS
Filed Jan. 15, 1927
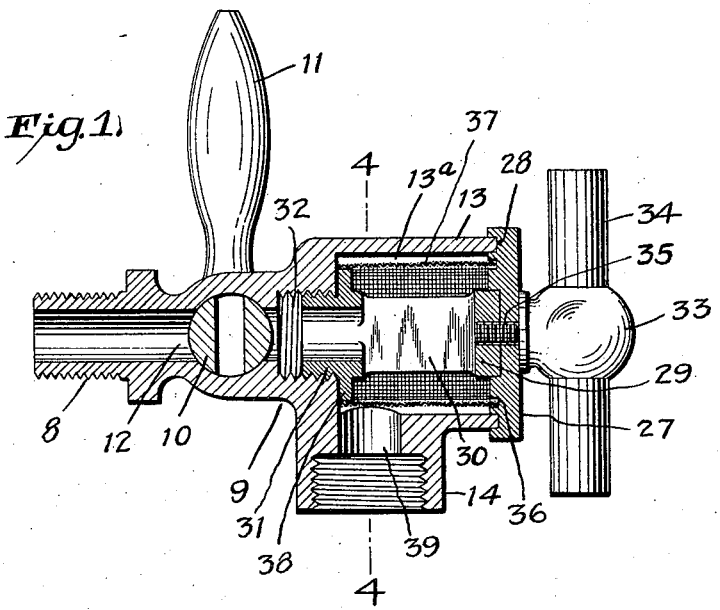
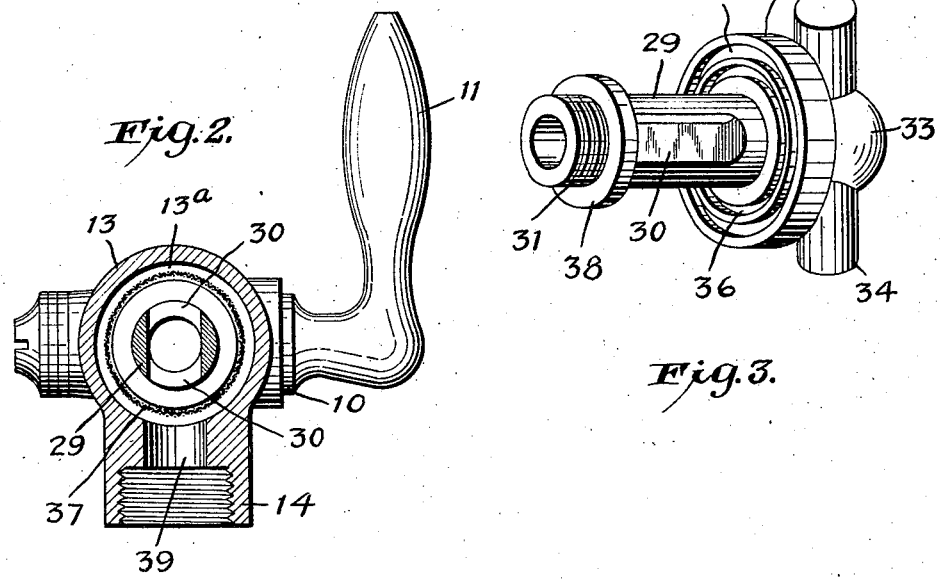
INVENTOR
Anthony Kleinlercher
BY
ATTORNEY Patented July 30, 1929.

1,722,804

UNITED STATES PATENT OFFICE.

ANTHONY KLEINLERCHER, OF BROOKLYN, NEW YORK, ASSIGNOR TO AARON M. SLOSS, OF NEW YORK, N. Y.

FITTING FOR COFFEE URNS.

Application filed January 15, 1927. Serial No. 161,254.

The invention relates to a screen fitting, more particularly for coffee urns, wherein the infusion can be transferred, through suitable conduits and by means of a pump, from the bottom of the receptacle to the top to pass again through the grounds in the bag.

The object of this invention is to provide a simple and advantageous fitting for use in such an urn whereby the grounds are more effectually prevented from reaching the pump, whereby the screen has ample capacity for passage of the liquid and for retention of the grounds, and whereby the screen can be easily removed carrying its charge of grounds or sediment, for cleaning, and can be as easily replaced, and whereby also a strong, solid, compact and inexpensive construction of the parts of the piping and connections is obtained.

In the accompanying drawings forming part hereof:

Fig. 1 is a view taken in a vertical longitudinal plane through a filter and valve unit embodying the invention.

Fig. 2 is a cross-section on the line 4—4 of Fig. 1; and

Fig. 3 is a perspective view of a part removed from said unit.

The inlet connection 8 of a unit or fitting 9 is adapted to screw into the outer end of a pipe leading from the bottom of the infusion chamber of a coffee urn. A turn-cock 10 having a handle 11 is placed in the inlet passage 12 of this fitting immediately outside the body; and an enlargement 13 of the fitting at the outer side of the cock and in line with the inlet connection affords a drum-like screen chamber 13ª.

This screen chamber has a lateral outlet connection 14, which is adapted to be connected with a conduit leading to the inlet side of a pump.

The outer end of the screen chamber enlargement 13 of the fitting 9 is entirely open, except as it is normally closed by a cap or head 27. This head is preferably formed with a circular groove 28 in its inner side adjacent the periphery to fit the rim of the wall of the chamber. A hollow removable spindle 29 intervenes between the removable head and the inlet end of the chamber 13ª, where it communicates with the inlet passage 12, and in its intermediate portion it has a lateral exit opening, advantageously provided by slotting the spindle from side to side so as to form longitudinally slotted openings 30.

The spindle 29 is most advantageously carried by the head 27, so as to be removable as a unit therewith, and its inner end 31 is preferably screw-threaded to screw into and out of a screw-threaded socket 32 at the inner end of the passage 12. The spindle is economically made of a separate piece from the head, to which it is clamped by the hub 33 of a handle 34 for removing the head and spindle, the said hub 33 having a screw stem 35 which passes through a central opening in the head into a tapped hole in the outer end of the spindle. It will be apparent, however, that these parts might be made in one piece. Screwing the end 31 of the spindle into the socket 32 draws the head against the outer end of the cylinder 12 forming a joint tight against leakage.

The head has another annular groove 36 on its inner side, just inside the groove 28, and this groove forms a seat or support for one end of a tubular screen 37. A circumferential flange 38 on the inner portion of the spindle, adjacent the fixed end wall of the screen chamber forms a seat for the other end of the screen, which is thus supported at a distance from the slotted portion of the spindle, which it surrounds, and spaced also from the encircling wall of the chamber.

The screen thus arranged will catch all grounds or clogging sediment carried by the infusion, preventing the same from reaching the pump, or from collecting in the dropped piping 15, 16, 17, 18. The screen is removable with the head 27 and spindle 29 by simply unscrewing and withdrawing the latter, and can then be slipped off and emptied. The interior of the slotted spindle 29 is also readily cleansed. To re-assemble the parts, the screen is simply slipped back on the spindle against the head, and the spindle and head are screwed back into place, properly centering the screen.

The outlet opening 39 from the screen chamber is through the bottom of the cylindrical wall and adjacent the inner or inlet end of the chamber. This insures that the screen chamber will be freely self-draining, and affords a screened dead-end pocket extending beyond the outlet wherein grounds can accumulate for a considerable time without obstructing the flow.

While the preferred embodiment of the invention has been described in detail, it will be understood that there may be various changes in details.

What is claimed as new is:

1. A fitting of the character described having an inlet connection and a screen chamber having a lateral outlet, a removable head on the outer end of said screen chamber, a removable hollow spindle intervening between said head and the inlet end of said chamber where it is in communication with said inlet connection, said spindle being slotted in its intermediate portion so as to provide elongated exit openings in two sides, and a removable tubular screen surrounding said spindle at a distance therefrom and spaced from the wall of the chamber.

2. A fitting of the character described having an inlet connection and a screen chamber having a lateral outlet, a removable head on the outer end of said screen chamber, a removable hollow spindle intervening between said head and the inlet end of said chamber where it is in communication with said inlet connection, circular screen seats at the head and the inlet end of said spindle, and a removable tubular screen supported at its ends on said seats to surround said spindle at a distance therefrom and spaced from the wall of the chamber.

3. A fitting of the character described having an inlet connection and a screen chamber having a lateral outlet, a removable head on the outer end of said screen chamber, a hollow spindle carried by said head and meeting the inlet end of said chamber where it is in communication with said inlet connection and having lateral opening in its intermediate portion, a circular screen seat on the inner side of said head, a screen seat flange on the inlet end of said spindle, and a tubular screen supported at its ends on said seat and flange.

4. A fitting of the character described containing a screen chamber having an outlet, said fitting having a fixed end provided externally with an inlet connection and internally with a screw socket, a removable head at the outer end of said screen chamber, a removable hollow spindle connected at its outer end with said removable head and being screw-threaded at its inner end for engagement with said socket, said spindle having a lateral opening, and a removable tubular screen surrounding said spindle at a distance and confined between said fixed end and removable head.

ANTHONY KLEINLERCHER.